United States Patent [19]
Wistendahl et al.

[11] Patent Number: 5,708,845
[45] Date of Patent: Jan. 13, 1998

US005708845A

[54] SYSTEM FOR MAPPING HOT SPOTS IN MEDIA CONTENT FOR INTERACTIVE DIGITAL MEDIA PROGRAM

[76] Inventors: Douglass A. Wistendahl, 99 E. Elm St., Greenwich, Conn. 06830; Leighton K. Chong, 133 Kaai St., Honolulu, Hi. 96821

[21] Appl. No.: 536,107

[22] Filed: Sep. 29, 1995

[51] Int. Cl.$^6$ .................................................. G06T 1/00
[52] U.S. Cl. .......................... 395/806; 395/762; 395/327
[58] Field of Search .................................... 395/154, 152, 395/155, 160, 762, 806, 807, 173, 327, 328, 329; 345/121, 122, 158; 348/7, 10, 12, 20; 358/341, 342

[56] References Cited

U.S. PATENT DOCUMENTS

| | | | |
|---|---|---|---|
| 5,065,345 | 11/1991 | Knowles et al. | 395/154 |
| 5,109,482 | 4/1992 | Bohrman | 395/154 |
| 5,204,947 | 4/1993 | Bernstein et al. | 395/157 |
| 5,319,455 | 6/1994 | Hoarty et al. | 348/7 |
| 5,442,390 | 8/1995 | Hooper | 348/7 |
| 5,453,779 | 9/1995 | Dan | 348/7 |
| 5,461,415 | 10/1995 | Wolf | 348/7 |
| 5,528,513 | 6/1996 | Vaitzblit | 364/514 A |
| 5,539,871 | 7/1996 | Gibson | 395/154 |
| 5,596,705 | 1/1997 | Reimer et al. | 395/326 |

OTHER PUBLICATIONS

ASSET-2 Publication, additional pages entitled "Real-Time Implementation of ASSET-2", U.K. Defense Research Agency, 1995.

"Interactive Television", W. Hodge, Mc–Graw–Hill, 1995, Table of Contents, pp. 13–19, 153–160.

Tracy Valleau's LinksWare, marketing material on LinksWare software, dated Jul. 1, 1995, from tracy@linksware.com.

*Primary Examiner*—Joseph H. Feild
*Assistant Examiner*—Stephen Hong

[57] ABSTRACT

A system for allowing media content to be used in an interactive digital media (IDM) program has Frame Data for the media content and object mapping data (N Data) representing the frame addresses and display location coordinates for objects appearing in the media content. The N Data are maintained separately from the Frame Data for the media content, so that the media content can be kept intact without embedded codes and can be played back on any system. The IDM program has established linkages connecting the objects mapped by the N Data to other functions to be performed in conjunction with display of the media content. Selection of an object appearing in the media content with a pointer results in initiation of the interactive function. A broad base of existing non-interactive media content, such as movies, videos, advertising, and television programming can be converted to interactive digital media use. An authoring system for creating IDM programs has an object outlining tool and a object motion tracking tool for facilitating the generation of N Data. In a data storage disk, the Frame Data and the N Data are stored on separate sectors. In a network system, the object mapping data and IDM program are downloaded to a subscriber terminal and used in conjunction with presentation of the media content.

13 Claims, 6 Drawing Sheets

SYSTEM FOR MAPPING HOT SPOTS IN MEDIA CONTENT FOR INTERACTIVE DIGITAL MEDIA PROGRAM

FIELD OF THE INVENTION

This invention relates to the field of interactive digital media systems, and particularly to a system for using media content in an interactive digital media program.

BACKGROUND ART

Technological development is fostering an increasing convergence of television, multimedia programming, and computers. The creation of a world-wide information infrastructure will support the viewing of motion pictures, multimedia programs, and newscast events on demand. It will provide access to telecommunications networks, databases, and information services over long distances, as well as facilitate the instantaneous exchanging of governmental, business, research, institutional, medical, and personal data, and teleconferencing and sharing of documents and information among organizations, workgroups, and individuals spread out over wide areas. The entry point for users to this information infrastructure is principally the interactive use of a visual display interface to the system.

Content is essential to the value users derive from use of the system. While much of the content being offered is newly created to take advantage of the latest developments in technology, there is a vast base of existing content that is non-interactive which users may desire to have access to, particularly media content in the form of movies, videos, video advertising, television programming, etc. However, if existing media content is merely offered as a digitized equivalent of its existing form, then there is little or no value added over obtaining the same content through the current media in which it is offered. The conversion of existing media content to interactive digital media adds value by rendering it capable of interactivity and linking to other forms of digital media.

The conversion of media content to interactive digital media use has heretofore been a laborious process as conversion tools have required developers to perform conversion tasks essentially manually. Many types of hyperlinking tools have been developed for rendering text and graphics materials "live" for interactive use, e.g., as discussed in *Multimedia and Hypertext*, edited by Jakob Nielson, published by Academic Press, Inc., 1995. Typically, a link is created between a word, phrase, icon, image, or other object appearing in the display to another text file (hypertext) or to another program or media function (hypermedia) to deepen the user's engagement in the system. Thus, when a user clicks with a pointing device such as a mouse on an object appearing in the screen display, an interactive media program will pull up another file or perform another function so as to provide the user with further information, response, or options. A series of hyperlinks may be followed to allow the user to pursue a subject to any desired depth or relational complexity. Such hyperlinking tools have found valuable use for online documentation, user assistance, interactive manuals, graphical operating systems, information retrieval, auditing and tracking systems, authoring systems, games, audiovisual programs, edutainment programs, etc.

However, conventional hyperlinking tools require the developer to embed linking codes or "anchors" manually in the content file which is to be rendered interactive. For example, if the content is a voluminous collection of "pages" to be displayed to the user, such as for an electronic encyclopedia, then conversion would require a large amount of time for the developer to .embed hyperlinking codes around each text object for each page of content. A current candidate for a universal language for marking documents and embedding hyperlinking codes is called Standard Generalized Markup Language (SGML). A multimedia extension to SGML known as HyTime has been accepted by the International Standards Organization (ISO) for marking of documents which may incorporate audio and video media. However, even when such hyperlinking tools are used for media content, such as a digitized video sequence, the marking of the sequence for "live" interactive use is currently accomplished by embedding hyperlinking codes around the object in each frame of the sequence (typically 30 frames per second for full motion sequence).

Digital video editing tools have also been developed for painting, coloring, sizing, altering, or otherwise editing still and motion images, compositing multiple images, text, and sound tracks together, animating and morphing images, compressing multimedia files for storage or transmission, etc. However, almost all such digital media editing tools require alteration of the underlying raw content file in order to create a new digital media content file. In most cases, conventional editing tools embed proprietary codes or use proprietary file formats to modify or re-specify an existing content file. As a result, the edited media file can only be run on compatible systems or platforms that have complementary display, playback, or decompression tools.

SUMMARY OF THE INVENTION

It is therefore a principal object of the present invention to provide a system for allowing media content, particularly a broad base of existing media content, to be used as interactive digital media programs. A specific object is to render media content to interactive use without locking it in to any particular system or platform, i.e., without embedding proprietary codes in the original media content. It is a further object to provide an authoring system for developing interactive digital media programs from media content using automated tools which can reduce the development time.

In accordance with the main object of the present invention, a system for allowing media content to be used as an interactive digital media program comprises: (a) media content in the form of digital data representing a series of successive display frames having respective frame addresses ("Frame Data"); (b) object mapping data ("N Data") specifying display location coordinates of objects intended to be interactive as they appear in the display frames of the media content; (c) linkages provided through an interactive digital media (IDM) program from the objects whose display location coordinates are specified by the N Data to respective other functions to be performed upon user selection of the objects in conjunction with display of the media content; and (d) a user system for operating the IDM program in conjunction with the display of the media content by detecting when an object appearing in one or more display frames is selected by a user and performing the function linked by the IDM program linkage thereto.

In accordance with the specific object of the invention, the N Data representing the display location coordinates and frame addresses of mapped objects are maintained separately from the Frame Data for the media content. The media content is thus kept intact and uncorrupted by any embedded special codes, so that it can be run (played) on any media system or platform. The N Data are preferably in a standard format so that they can be widely used in the creation of many types and varieties of IDM programs.

In accordance with a further object of the invention, an authoring system comprises an editing subsystem for editing media content in the form of digital data representing a series of successive display frames having respective frame addresses ("Frame Data"); (b) an object mapping subsystem for generating object mapping data ("N Data") specifying display location coordinates of objects intended to be interactive as they appear in the display frames of the media content; (c) interactive digital media (IDM) program development tools including a hyperlinking tool for establishing linkages from objects whose display location coordinates are specified by the N Data to other functions to be performed upon user selection of the objects in conjunction with display of the media content; and (d) said object mapping subsystem having an object mapping tool for generating the display location coordinates for an object appearing in a display frame when an author marks the object as it appears in a display frame. The object mapping subsystem further includes an object motion tracking tool for generating the display location coordinates for an object in motion based upon an author marking an object as it appears in one display frame and detection of the marked object over subsequent frames of a series of display frames.

In a preferred network system, media content in the form of movies, videos, and the like, is used with an interactive digital media (IDM) program by downloading the Frame Data for the movie and the N Data for designated "hot spots" appearing therein from a network server to a subscriber terminal upon request. An IDM program selected for the movie is also downloaded from the server or, alternatively, is loaded by the subscriber in the terminal. The subscriber terminal runs the IDM program in conjunction with display of the movie and performs the hyperlinked functions specified in the IDM program whenever the subscriber clicks on a "hot spot" appearing in the movie, such as with a remote control pointer. Thus, the previously non-interactive movie is rendered as interactive entertainment to the subscriber.

A related aspect of the invention is a disk storage format for storing the Frame Data and the N Data. The Frame Data for the media content is stored physically or logically separate from the N Data for the designated objects. The disk preferably has a main sector where the Frame Data are stored, and a smaller, outermost sector where the N Data is stored. With this format, movie or video disks having the N Data recorded in the outermost sector can still be played in conventional player systems which can only playback the movie and cannot use the N Data.

The present invention is described in greater detail below, together with its further objectives, features and advantages, in conjunction with the following drawings:

DETAILED DESCRIPTION OF THE INVENTION

Multimedia systems have evolved to sophisticated systems today that can support photographic quality resolution (1280×1024 pixels), millions of colors on a display screen, high-fidelity audio, large-scale storage and retrieval of still and full-motion video, large-scale arrays of memory storage, plug-and-play interfaces to multimedia devices, and high-capacity network linkages that can support digital video and videoconferencing from desktop systems. For an overview of hardware and software technologies developed for multimedia systems, reference is made to *Multimedia Systems*, edited by Jessica Keyes, published by Mc-Graw Hill, Inc., 1994.

The rapid technological advances of the last decade have made digital full-motion video available on today's desktop systems. In the next decade, advanced network technologies and integrated multimedia distribution systems will permit full-motion video with high-fidelity audio to be delivered on demand to offices and homes virtually anywhere in the world. Such advanced systems and the possibilities for their use are described in *Interactive Television: A Comprehensive Guide for Multimedia Technologies*, by Winston W. Hodge, published by McGraw-Hill, Inc., 1995. For such future, and even current, multimedia systems, a high demand will be placed on being able to make interactive use of the huge base of existing content, particularly media content such as movies, videos, and television programming.

It is projected that a primary scenario for delivery of video-on-demand (VOD) in the future will be through an office workstation or an interactive television set at home connected via cable, fiber, or other high-bandwidth link to network servers of a media services company for a local area. The interactive television set is expected to have an advanced set-top box for handling subscribers' requests and uses of interactive media services. Principal services which customers are expected to ask for include program and viewing time selection, order placing, menu navigation, home shopping, interactive games, random scenes selection, TV set controls, and subscriber billing review. For simplicity and ease of use, the television and set-top box should be controlled by a simple remote device which will include a light-beam pointer for pointing to menu choices, icons, windows, photographs, and other objects of interest appearing on the screen. A primary application of the present invention is to facilitate the conversion of non-interactive media content to interactive digital media use by establishing remote-controllable objects or "hot spots" on the television screen display for user selection.

A basic concept of the invention is the mapping of objects in digital media presentations as "hot spots" without embedding any special codes in the original digital media content. This is accomplished by specifying the display location coordinates of selected objects within a frame or series of frames of a display and their frame addresses. The display location coordinates and frame addresses of the "hot spots" are stored as data that are physically of at least logically separate from the media content. This allows the original media content to be accessed and run on any system without having to handle proprietary or platform-dependent codes. The coordinate/address data of the "hot spots" are preferably in a standard format that can be accessed by any interactive digital media (IDM) program written to run with that media presentation. When the media content is played with the IDM program, a user can select "hot spots" appearing in the display to trigger further developments. The IDM program responds to user selection of "hot spots" by launching further layers of display presentations and/or triggering other program functions, such as launching another application, initiating the operation of another system, or connecting to an external network such as a World Wide Web™ page or service on the Internet.

The following description of the invention focuses primarily on the mapping and use of "hot spots" appearing in the visual display of a digital media presentation. However, it should be understood that a "hot spot" can be any object identifiable in any type of digital presentation, including a sound or music segment or even a bodily response in virtual reality systems.

Interactive Digital Media System Overview

Figure 1:
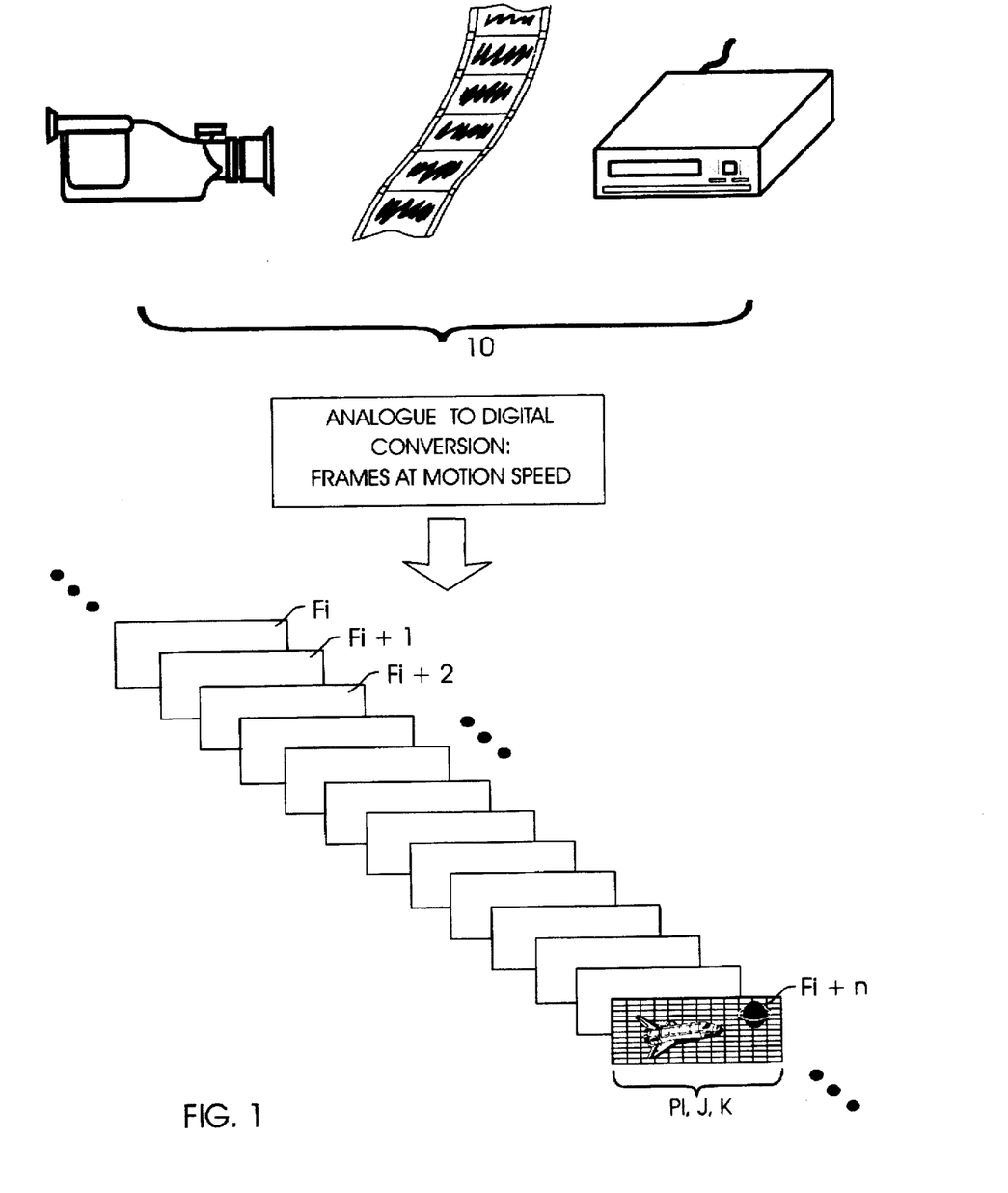
FIG. 1 is a schematic drawing showing the conversion of original media content to digital frame data.

In a basic implementation of the invention, as illustrated in FIG. 1, original media content 10, such as a movie, video program, or live television program captured by a video camera, etc., is digitized via an analog-to-digital (A/D) converter 12 into digital data representing a series of display frames $F_i$, $F_{i+2}$, $F_{i+3}$, ..., in a time sequence t for display on a display screen. Each frame F has a frame address i, i+1, i+2, ... corresponding to its unique time position in the sequence, and is composed of an array of pixels $p_i$ uniquely defined by location coordinates represented by j rows and k columns in the display area of each frame. The pixels of the frame are also digitally defined with chrominance and luminance values representing their color and brightness levels on the display. For full motion video, a sequence of 30 frames is typically used per second of video. Each frame is composed of an array of pixels forming the display at the screen's given resolution, e.g., 640×480 pixels at a typical VGA resolution, or 1280×1024 at a higher SVGA resolution. Color resolution at a high 24-bit level may also be used. Thus, for a desktop system using a 32-bit internal data bus, and depending on whether and what data compression scheme is used, full motion video of 30 frames per second at full color, SVGA resolution can have a digital data stream from about 250 KBytes to 1.2 MBytes per second.

Figure 2:
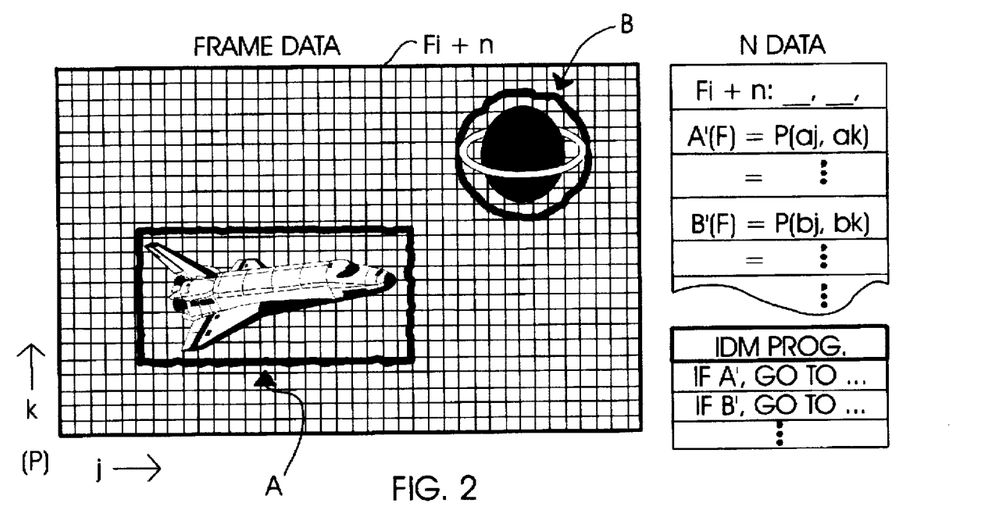
FIG. 2 is a schematic drawing showing the generation of object mapping data designating "hot spots" in a display frame.

In FIG. 2, an individual frame is illustrated showing an image of an object A such as a face next to an object B such as the sun. In interactive use, the user can point at (click on) the face A or the sun B to connect to further information or a further development in the story being presented. In accordance with the invention, the original media content is converted to interactive use without embedding special codes in the digital data for the frames, by mapping the "hot spots" as separate data which are used in an interactive digital media program associated with the media content. Thus, for the frame $F_i$, a "hot spot" area $A'(F_i)$ is mapped for the object A, and a "hot spot" area $B'(F_i)$ is mapped for the object B. The definition of a "hot spot" can be made by defining a set of pixels in the display which comprise an outline around the designated area, e.g., $p(a_j, a_k)$ .... Alternatively, the area may be defined by a vector contour encompassing the designated area, or any other suitable array definition method as is well known in the computer graphics field. The display location coordinates of the defined pixels and the frame addresses of the frames in which the area appears are stored separately as object mapping data.

The original media content is thus rendered in the form of a stream of digital data, referred to herein as "Frame Data", which represent the series of display frames F constituting the movie or video sequence. Concurrently, for each frame $F_i$, the object mapping data, referred to herein as "N Data", are generated to define the display location coordinates of designated "hot spot" areas in the frames of the movie or video sequence. In accordance with a basic principle of the invention, the N Data mapping the "hot spots" are maintained as physically or at least logically separate data from the Frame Data for the media content. For example, the Frame Data and the N Data may be recorded as physically separate sectors on a video laserdisk or CD, or may be stored as logically separate data files in the memory storage of a video server. In this manner, the objects which are rendered interactive in the original media content are tagged for use in a compatible interactive digital media (IDM) program without embedding any proprietary or platform-dependent codes in the media content. Thus, the media content data can be run on any digital media player and the N Data can be used by any IDM program.

The N Data defining the hot spots are preferably in a format that may become established in the industry for handling the frame addresses and display location coordinates for the designated objects, as explained further herein. The standard-format N Data can thus be accessed by any interactive digital media (IDM) program written in standard applications programming languages. In accordance with the invention, the N Data define the location of the designated "hot spots" or "anchors" to which hyperlinks are established in the IDM program. This is represented in FIG. 2 by "IDM PROG." which references the "hot spot" N Data values as anchors for hyperlinks to other files or executable functions ("GO TO ..."). Then when a user clicks on a designated "hot spot" by pointing to any display position encompassed within the area defined by the object mapping data, the IDM program recognizes that the object pointed to has been selected, and consequently causes the other file or function linked to the "hot spot" to be performed.

Running Media Content and IDM Program from Network Server

Interactive digital media programs in accordance with the invention can be run on any of a wide range of platforms. In large media services networks, the media content, N Data, and associated IDM programs are downloaded via the network to user or subscriber terminals upon request. For individual use, the programs are loaded via peripheral devices into personal computers, game players, or other media playing consoles. The following description focuses on the delivery of media content and IDM programs through networks, such as cable TV, telephone networks, digital line and fiber optic networks, and wide area digital networks. In the future, the prevalence of network delivery of interactive media services is expected to increase greatly toward a paradigm often referred to as the "multimedia revolution".

Figure 3:
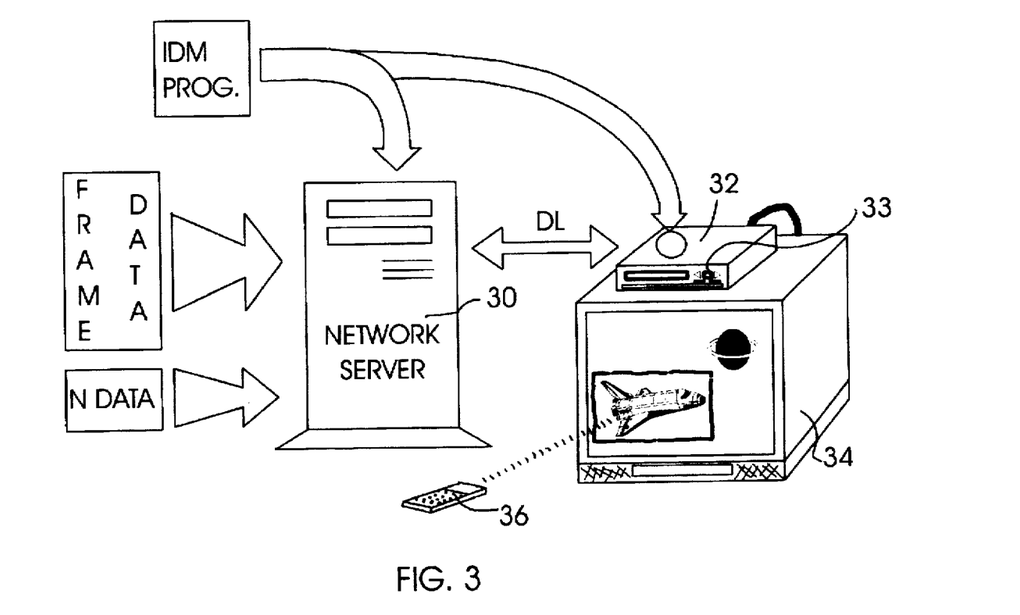
FIG. 3 is a schematic drawing showing the transmission of digital data for the original media content and object mapping data for objects therein from a network server to a subscriber terminal.

An example of network delivery of interactive digital media programs in accordance with the invention is shown schematically in FIG. 3. Typically, a network server 30 provides media services from a node or hub in a company's service area. The server 30 is coupled to subscriber terminals through a suitable data transmission link DL, such as cable wiring, fiber optic lines, telephone wiring, or digital data links. The subscriber's terminal is typically in the form of a "set-top" box 32 connected to the subscribers' TV or screen display 34, but it can also be a computer or other type of terminal. An important concept for network media services is "video-on-demand", wherein the server 30 can access large digital libraries of movies, videos, and other types of media content and transmit them to subscribers upon request. The server 30 transmits both the Frame Data for the media content and the N Data and IDM program for rendering the "hot spots" therein interactive to the subscriber's set-top box 32 via the data transmission link DL. The subscriber uses a remote control device 36 to operate the set. For interactive use, the remote device 36 includes an optical pointer which emits an infrared or other light beam. As known conventionally, a sensor 33 in the set-top box is used to detect the position and angle of the beam from the remote control pointer in order to detect the area of the display 34 being pointed to.

The media content with N Data delivered to the subscriber is operated interactively by the subscriber through the IDM program. The IDM program can be a dedicated program indexed to N Data which are specific to a single type of interactive use of the media content. Alternatively, a production studio or studio library which owns the media content property may find it more effective to publish a complete listing of N Data for an owned property which includes a mapping of all "hot spots" likely to be of interest for interactive programs. IDM program writers can then use the published listing of N Data to create many and more diverse program offerings for a particular media content property. For dedicated IDM programs, the IDM program data can be stored together with the N Data in association with the media content and transmitted together by the server 30 to the subscriber's terminal. For multi-use IDM programs, the N Data can be stored in association with the media content and transmitted from the server 30, while subscribers can choose any IDM program they wish to play from a publishing or retail outlet and load it into their terminals via a peripheral device provided with or connected to their set-top box 32, such as a CD-ROM drive or a ROM card insertion slot.

Figure 4:
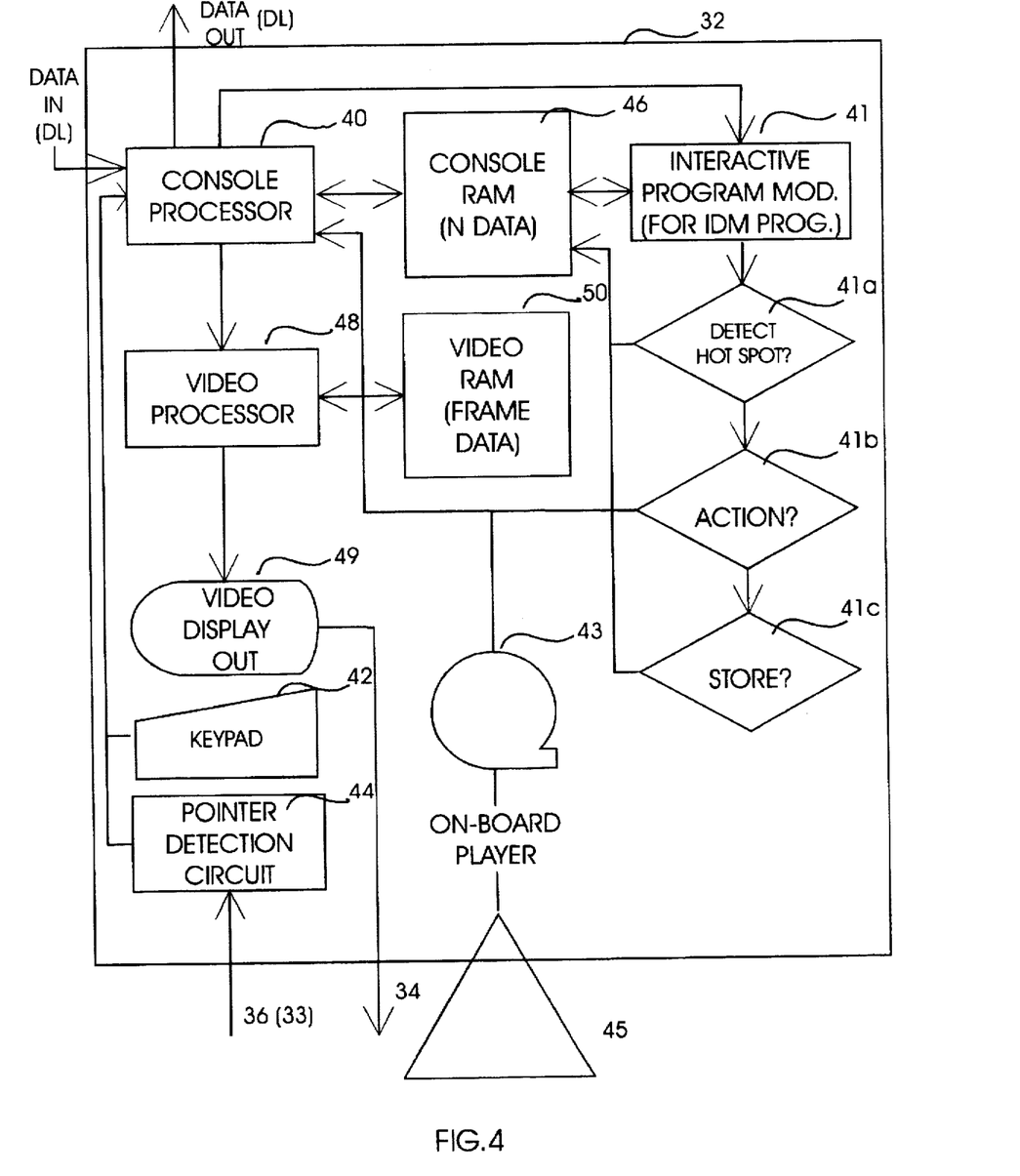
FIG. 4 is a schematic diagram of the components of a subscriber terminal for use in conjunction with an interactive digital media program.

FIG. 4 illustrates schematically how an interactive digital media system uses the media content Frame Data, N Data, and the IDM program together to provide interactive entertainment. The system includes the aforementioned set-top box 32, display 34, remote control pointer 36, and data link DL to the external network server. An on-board CD-ROM player or other data reading device 43 may be provided with the set-top box 32 for input of data, indicated at 45, such as by loading from a selected CD or insertable disk or card. Input from the remote control pointer 36 is detected by the sensor 33 on the set-top box and processed to determine its target via a pointer detection circuit 44.

In the principal mode of use, the subscriber inputs a request to the service company for an interactive media program through the set-top box 32, using an on-board keypad 42 or through menu selection by using the remote control pointer 36. For example, the subscriber can request the interactive program "Movie Trivia Info" for the movie "The Maltese Falcon". This interactive program will run the movie while displaying pop-up movie trivia about the stars Humphrey Bogart, Sidney Greenstreet, and Peter Lorre or objects such as the Maltese falcon whenever the user clicks on these "hot spots" appearing in different scenes of the film. To the user, movie viewing which had been a passive experience is rendered interactive so that the user can play trivia games or spark conversations in conjunction with the running of the movie.

A console processor 40 for the set-top box processes the subscriber request and transmits it via the data link DL to the network server 30. In return, the server 30 first transmits the IDM program data for "Movie Trivia Info" and the N Data for the movie to the subscriber's set-top box where the console processor 40 operates to store the data in a console RAM memory 46. The console processor 40 can load and run the IDM program as a multi-tasking function concurrently with other console functions, as indicated in FIG. 4 by the separate module 41. Alternatively, the IDM program can run on a separate processor (41) in parallel with the console processor.

The remote downloading and playing of games and other types of interactive programs can be used even with conventional cable TV networks which do not presently have a two-way data link DL between server and subscribers. In an example for video games, the cable company broadcasts modulated signals for the game data on a dedicated cable channel. In response to a subscriber's telephone request, the cable company transmits a signal enabling the subscriber's converter box to receive the data. The game data is then demodulated through a modem connector and downloaded to the subscriber's game player. For purposes of the present invention, this would allow loading of the IDM program and N Data in the game player. The game player can now operate the IDM program in conjunction with the media content, as described next.

After the IDM program is loaded, the network server 30 begins to transmit the movie as digital Frame Data to the subscriber's set-top box 32. The Frame Data is routed by the console processor 40 to the video processor 48 and associated video RAM memory 50 which process the display of frames of the movie via video display output 49 to the subscriber's television 34. Audio processing is subsumed with the video processing and is not shown separately. For typical video-on-demand servers, a requested movie can be transmitted to the subscriber as a series of 30-second movie blocks within a 6-minute start of a request. The video processor coordinates the receipt of the blocks of transmitted data into a display of video output which the user sees as a continuous movie.

As designed for interactive video systems, the remote control 36 includes an optical pointer for digitally pointing to objects displayed on the television screen. As the movie runs, the user can point the remote control pointer 36 to a designated actor or object appearing on the television display and click on the desired object. The N Data for the movie defines the area encompassing the object as a "hot spot". Clicking the pointer results in the target's display location coordinates being detected by the pointer detector module 44. The target's coordinates are input via the console processor 40 to the IDM program running concurrently with the movie. As indicated at box 41a, the IDM program compares the target's coordinates to the N Data mapping of "hot spots" stored in memory to identify when a "hot spot" has been selected, and then executes the response programmed by the hyperlink established for that "hot spot", as indicated at box 41b.

For example, the hyperlinked response may be to display trivia information about the actor or object clicked on. The IDM module retrieves the trivia information stored with the IDM program in memory and sends it to the console processor 40 to process a pop-up window, overlay display, audio track, etc., in conjunction with the movie. To illustrate, upon the user clicking on the Maltese falcon, the hyperlink established in the "Movie Trivia Info" program can initiate a linked display of text or graphics explaining the Maltese origins of the falcon in a pop-up window on the television screen, or may execute another program function such as initiating an Internet connection to a World Wide Web™ service which offers a replica of the falcon for purchase. In this manner, unlimited types and varieties of interactive actions can be activated for existing movies, videos, and other media content.

As an option, upon selection by a user clicking on an object, the IDM program can issue an instruction via the console processor 40 to the video processor 48 to slow down or pause the running of the movie to allow time for the user to absorb the IDM program response. Alternatively, the user may wish to bypass the response and store it to be reviewed after the movie is finished. By input from the remote control pointer 36 (e.g., clicking on a displayed "Save" button), the particular scene location and clicked object and/or its linked response can be saved in the console RAM 46 for retrieval during a Review mode of the IDM program, as indicated at box 41c in FIG. 4.

Authoring and Mapping of "Hot Spots" As N Data

The mapping of "hot spots" or objects appearing in original media content to enable the operation of an interactive digital media (IDM) program is an important aspect of the present invention. In the production of an IDM program, the initial work of creating linkages between words, graphic images, objects, and/or scenes of a movie or video sequence to other interactive functions is referred to as "authoring". An author typically works on a workstation using editing and hyperlinking software provided with various tools for working with particular media. An example of authoring software for multimedia programs is the PREMIER™ multimedia development system sold by Adobe Systems, Inc., of Mountain View, Calif. Such an authoring system is typically provided with editing tools which can be adapted as "hot spot" mapping tools for authoring IDM programs in accordance with the present invention.

Technology for mapping objects appearing in a display frame has been developed in the fields of interactive program development as well as for video editing. For example, the LINKSWARE™ hypertext development software offered by LinksWare Company, of Monterey, Calif., allows an author to click on a word or phrase in a text document and create a hyperlink to another file, and to store the linking information separate from the document itself. Video editing software sold under the name ELASTIC REALITY 3™ by Elastic Reality, Inc., of Madison, Wisc., has shape creation and compositing tools which can outline a shape in an image field and store the shape data as a separate file.

The above described tools which are currently available can be adapted to the purposes of the present invention for authoring an IDM program by mapping "hot spots" in a media presentation. That is, using a shape outlining tool similar to that offered in the ELASTIC REALITY 3™ software, an object A as shown in FIG. 2 can be outlined with a cursor, and the display coordinate addresses for the pixel elements of the outlined shape can be stored in a separate file as object mapping data. Consequently, a hyperlinking tool similar to that offered in the LINKSWARE™ software is used to establish programmed hyperlinks of the object mapping data to other program functions which provide the IDM program with its interactive responses. The details of use of such editing and hyperlinking tools is considered to be within the realm of conventional technical ability and is not described in further detail herein.

Figure 5A:
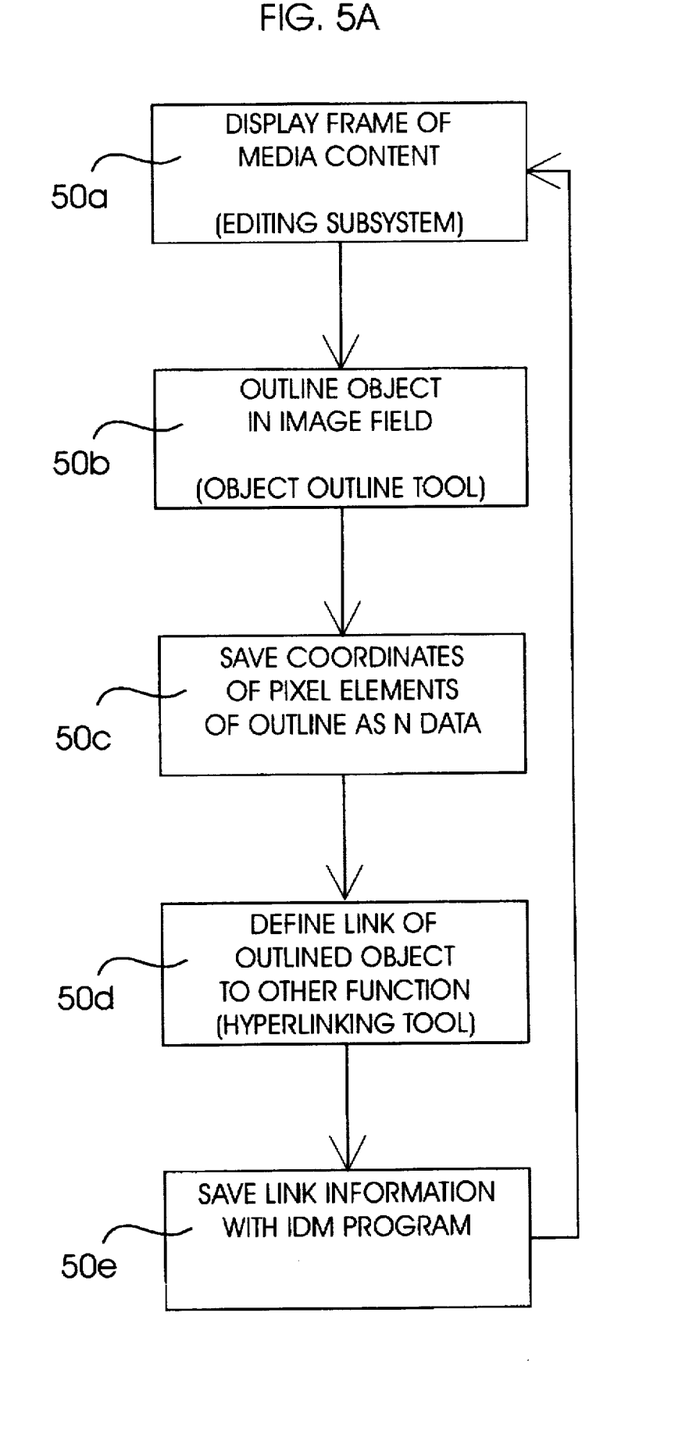
FIG. 5A is a procedural diagram for an object mapping tool for generating N Data for objects in a display frame.

An example of a procedural sequence for using an object mapping tool in an authoring system is shown in the diagram of FIG. 5A. First, a display frame of the media content is called up on the editing subsystem, as indicated at box 50a. Using an outlining tool similar to that provided in the ELASTIC REALITY 3™ software, the author can draw an outline around an object in the image field using a pointer or other cursor device, as indicated at box 50b. The outline, i.e., the display location coordinates of the pixel elements constituting the outline, and the frame address are saved as N Data at box 50c. Then using a hyperlinking tool similar to that provided in the LINKSWARE™ software, the author can define a hyperlink between the object outlined, now specified as N Data, and another function to be performed by the IDM program, as indicated at box 50d. The hyperlink information is saved with the IDM program at box 50e. The procedure is iterated for all objects to be mapped in a frame and for all frames of the movie or video. The IDM program can be stored together with the N Data or separately, depending upon whether the N Data is for dedicated use or multi-use.

The object mapping function can use the same outline data of one frame for succeeding frames if the object appears in the same position in the other frames, i.e., is non-moving. This saves the author from having to draw the same outline in the other frames. Even further, the outline data of a non-moving object appearing in a first frame can be stored with only the frame address of the last frame in a sequence in which the object appears unchanged in order to compress the N Data required to map the object over the sequence of frames. The IDM program can later uncompress the N Data and use the same outline data for the sequence of frames.

In accordance with a further development of the present invention, the object mapping procedures can include a motion tracking tool for automatically generating N Data for an unchanging object in motion across a sequence of frames. It will be appreciated that the mapping of a number of "hot spots" in each frame of a full motion video sequence or movie which may run from a few minutes to a few hours duration can be a hugely laborious task. Motion tracking and motion estimating techniques have been developed recently which can be adapted for a motion tracking tool to be used in the invention. For example, a motion tracking program named ASSET-2 developed by Stephen M. Smith at the U.K. Defense Research Agency, Chertsey, Surrey, U.K., uses feature segmentation and clustering techniques to produce an abstracted cluster representation of objects in successive frames of a video sequence. Using statistical comparisons, a cluster characterized by a similar set of features appearing at different positions in a path across a series of frames can be recognized as an object in motion. The object can then be tracked to varying degrees depending upon the sophistication of the particular applications program, such as for traffic monitoring, target acquisition, etc. At the simplest level, an object in motion is detected if it is unchanging, i.e., is not rotating or being occluded by other objects in three-dimensional view. With more advanced techniques, the object can be recognized if it retains some recognized features while rotating or moving behind another object. A general description of motion tracking or motion estimating techniques is given in *Machine Vision*, by R. Jain, R. Katsuri, and B. Schunck, published by McGraw-Hill, Inc., New York, N.Y., 1995.

Another motion estimating technique is one used for compression of video images. MPEG-2 is a video compression standard developed by the Motion Pictures Expert Group, a committee of the International Standards Organization (ISO). MPEG-2 uses interframe predictive coding to identify pixel sectors which are invariant over a series of frames in order to remove the invariant image data in subsequent frames for data compression purposes. A general description of MPEG-2 and motion estimating techniques is given in *Digital Compression of Still Images and Video*, by Roger Clarke, published by Academic Press, Inc., San Diego, Calif., 1995.

Figure 5B:
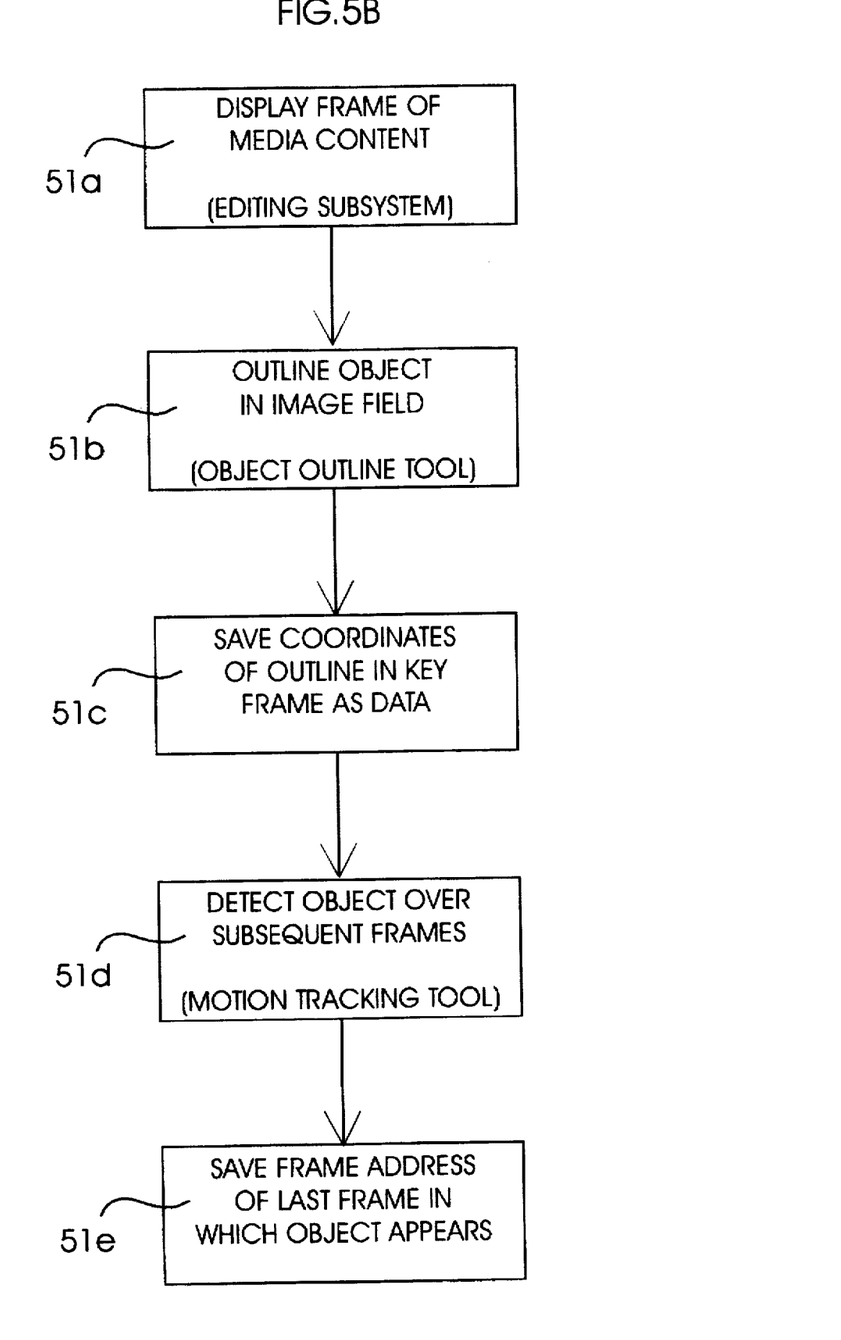
FIG. 5B is a procedural diagram for an object motion tracking tool for generating N Data for objects in motion over a sequence of display frames.

The above described motion tracking techniques are adapted to the present invention to automate the generation of N Data for objects in motion in a movie or video sequence. An example of a procedural sequence for using a motion tracking tool in an authoring system is shown in the diagram of FIG. 5B. First, a display frame of the media content is called up on the editing subsystem, as indicated at box 51a. Using an outlining tool as before, the author draws an outline around an object and marks its position as it appears in a first or "key" frame, as indicated at box 51b. The outline data, position, and frame address are saved as N Data at box 51c. Then, a motion tracking tool similar to the ASSET-2 system of the U.K. Defense Research Agency or the MPEG-2 motion estimating technique is used to detect the image of the object as it moves across subsequent frames at box 51d, until a last frame in which the object is detected is reached. The position of the object and frame address of the last frame in the sequence are then saved as N Data at box 51e. The use of the motion tracking tool saves the author from having to draw the outline around the object in each frame of the sequence, and also compresses the amount of N Data required to specify the mapping of the object in those frames.

Figure 5C:
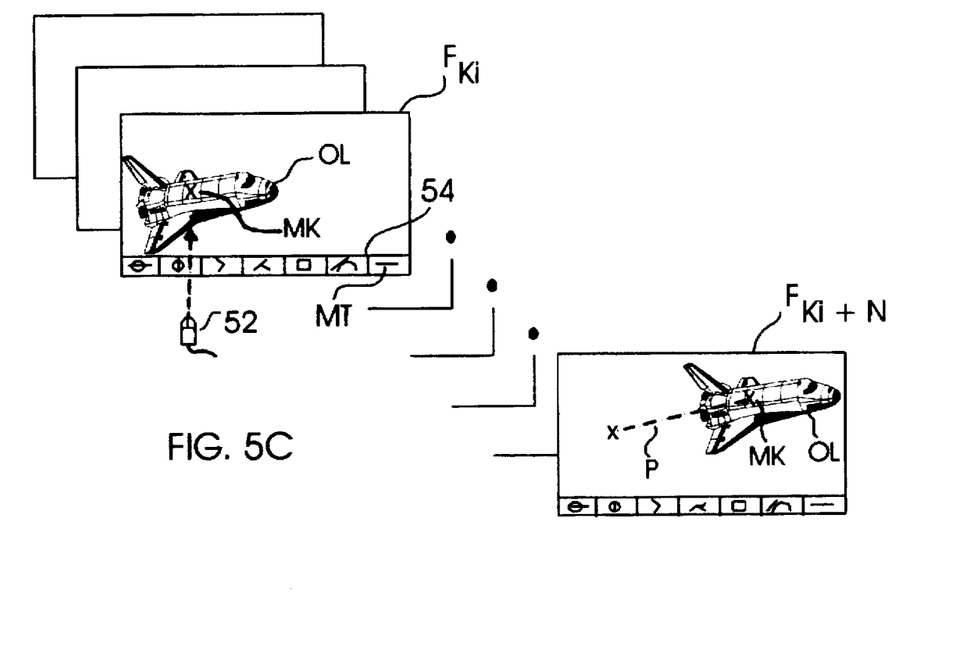
FIG. 5c illustrates use of the mapping and motion tracking tools for automatically generating N Data for an object in motion.

The use of the motion tracking tool for N Data generation in accordance with the present invention is illustrated in FIG. 5C. The author first brings up on the workstation a key frame $F_{Ki}$ of a series of frames in a full motion movie or video sequence. Using a mouse or other type of pointing device 52, the author delineates an object in the key frame, such as the airplane shown in frame $F_{Ki}$, by drawing an outline OL around the airplane. The author also marks the position of the object in the key frame by designating a marker MK in a central position within the outline OL in frame $F_{Ki}$. The author then runs the motion tracking tool by clicking on an MT button of a tool bar 54 in a graphical interface for the authoring program. The motion tracking function operates to identify the object indicated to be within the outline OL in frame $F_{Ki}$ where it appears in the succeeding frames of the sequence until a last frame $F_{Ki+N}$ is reached in which the object is detected. The outline data and position of the object in the key frame and the position and frame address of the last frame are stored as N Data by the authoring system.

Alternatively, the authoring system can use a conventional editing tool for advancing through a sequence of frames and marking the position of the object as it moves across the frames until a last frame is reached. This allows a path P of motion to be specified in terms of the progression of positions of the marker MK for the object. For motion that follows a straight line or simple curve, the author can simply mark the outline OL and the marker MK in frame $F_{Ki}$ and mark the end position of the marker MK in a selected frame N steps removed from the key frame. Smooth motion to the human eye can be approximated well by a display of image frames at the rate of about 30 frames/second. A typical selection for the number N of frames for following an object in motion smoothly might be an interval of 15 (0.5 second), 30 (full second), up to 60 (2 seconds) frames or more. The author thus advances to frame $F_{Ki+N}$ and marks the position of the object in that frame. The path P can then be automatically filled in using a typical "in-betweening" function commonly provided in video editing software, such as the ELASTIC REALITY™ software, or a simple vector function. The outline and the path data are then stored as N Data.

With the above described object mapping and motion tracking tools, an author can readily outline a number of "hot spots" in a full motion sequence and generate N Data automatically over a series of frames. The automatic generation of N Data over extended time increments makes the mapping of objects in media content of long duration such as a two-hour movie a manageable task. When the N Data has been specified for the mapped objects, hyperlinks to other interactive functions can be readily established using conventional hypermedia authoring tools.

Distribution of Media Content and N Data

Figure 6:
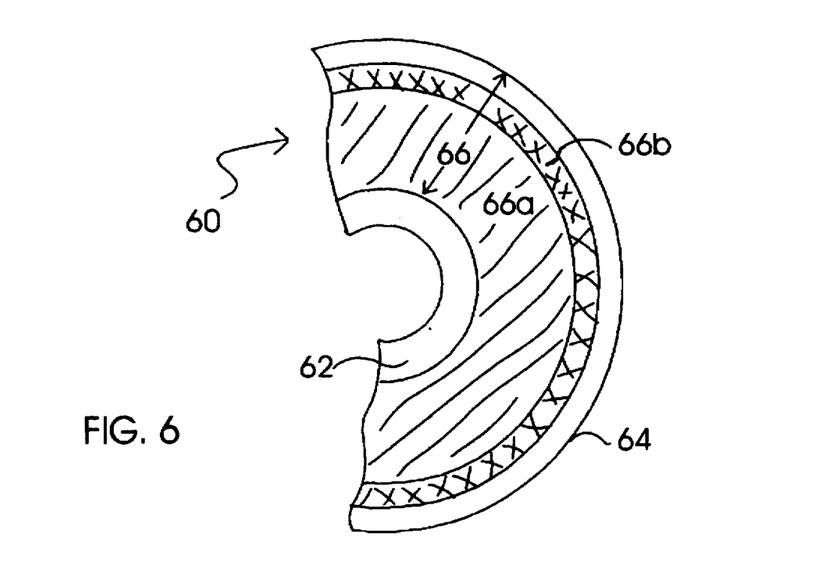
FIG. 6 is a schematic illustration of a disk storage format for recording media content data with object mapping data for an interactive digital media program.

In the present invention, the N Data for marked objects are maintained as separate data from the media content so as to leave the latter uncorrupted by any embedded or proprietary codes. The IDM program with its hyperlinking information may be stored with the N Data or as a separate program depending upon whether the N Data is for dedicated use or multi-use. The transmission of media content and N Data, with or without the IDM program, has been described previously for a network. For product distribution and individual purchase, the media content and N Data (with or without the IDM program) are recorded in a unique format in a storage disk. An example of such a disk 60 is shown in FIG. 6 having a center hub 62 and an outer edge 64 with an optically readable data space 66 therebetween. Digital data for programs, sound tracks, video sequences, movies, etc., are typically stored as optically readable marks representing binary 1s and 0s in the data space 66. For media of smaller total data volume, e.g., 640 megabytes and under, the industry standard is a compact disc or CD which is written on one side. For larger data volumes up to 10 gigabytes and higher, such as for full-length movies and videos, laser disks of a larger size, and new disk formats of CD size with multiplied data density written on both sides, have been developed.

In FIG. 6, the media content data is shown stored in a large inner sector 66a, while the N Data is stored on a narrow outermost sector 66b. Isolating the N Data on the outer extremity of the disk in this way allows the disk to be used both in new players which can utilize the N Data for interactive programs, as well as in conventional players which simply playing back the non-interactive media content. The new disk players for interactive media content are configured to be able to read the outer N Data sector and retrieve the N Data for use in an IDM program. If the N Data is for dedicated use, then the IDM program may also be stored with the N Data in the outermost sector 66b. Using data compression techniques as described above, the N Data for media content of even a long duration can fit in a relatively small data space, thereby taking up only a small percentage of the total disk space.

Other Applications

The present invention allows the broad base of existing media content in the form of presently non-interactive movies and videos to be rendered interactive through the generation of N Data that will be used in an interactive digital media program. The N Data are kept as separate data. This allows the media content to remain intact and continue to be playable in existing players. A new generation of interactive games and programs can be authored using the base of existing movies and videos as media content.

The use of N Data for mapping "hot spots" in media content can also be applied to new applications for existing broadcast or cable TV programming which will have increasing importance in the future. For example, advertising infomercials and home shopping shows are becoming increasingly desired and profitable. Such home shopping shows can be rendered interactive by mapping the N Data for "hot spots" of objects being displayed for sale or depicted in an advertising spot. In existing cable network systems, the N data and IDM program can be downloaded to the subscriber's cable converter box through a dedicated channel as described previously.

When the infomercial or home shopping show is selected for viewing by the subscriber, a console operating system (enhanced with IDM operation and pointer detection capability) uses the IDM program and N Data stored in RAM to identify which object the subscriber points to with the remote control pointer. The console operating system may also or alternatively have a stored IDM-like utility which allows it to perform certain basic functions expected for an infomercial or home shopping show, such as transaction processing or information retrieval routines as a result of selection of objects in the display. For example, the IDM-like utility can process the display of a text file downloaded with the N Data to provide information on the price, source, contact number and/or address for a selected object, or it can store the information in a user file for later review by the subscriber. If the network to which the system is connected is a digital network, the IDM-like utility may even connect to an externally executed function such as dialing and connecting to an Internet address or World Wide Web™ page to place an order for the selected object.

Another use for the N Data concept can be to render even standard TV programming interactive. For a example, a TV program may consist of a panel of speakers or entertainers to discuss issues and act out roles in response to audience input. N Data mapping of the panelists can be downloaded to the subscriber's cable converter box or set-top box prior to the running of the program. During the program, the subscriber can click with the pointer on one of the panelist, and input a question or comment via the keypad provided with the set-top box. The console, through a stored IDM-like utility downloaded with the N Data or stored on-board as part of its set, performs desired functions such as relaying the text message over the cable back to the network station, where the message is then sent on to the production studio for live response by the panelists. In this manner, even the existing cable TV network system can be provided with a semblance of interactivity through the use of N Data mapping.

The N Data concept can also be extended to the mapping of objects in a virtual reality program. Conventional virtual reality programs are written as a single program encompassing all of its responsive effects. However, by using separate N Data mapping, a virtual reality program can be written with a media component for the scene presentation, and an IDM component which uses multi-use N Data generated for the media component to call up selected types of interactive responses when the player touches or points to an object appearing in the media component. For example, the media component can play the scene presentation of "Jurassic Park", while an educational IDM component can call up displays of information about various dinosaurs pointed to, or an action IDM component can call up an action response or scene changes when various dinosaurs are encountered. In this way, different types of interactive programs can be written using the same media component and N Data.

Although the invention has been described with reference to the above-described embodiments and examples, it will be appreciated that many other variations, modifications, and applications may be devised in accordance with the broad principles of the invention disclosed herein. The invention, including the described embodiments and examples and all related variations, modifications, and applications, is defined in the following claims.

The invention claimed is:

1. A system for allowing media content to be used in an interactive digital media program comprising:

(a) first user means for receiving media content in the form of data representing a series of successive display frames having respective frame addresses ("Frame Data");

(b) second user means for receiving object mapping data ("N Data") separately from the media content, said N Data specifying display location coordinates of objects intended to be rendered interactive as they appear in the display frames of the media content, wherein said N Data for each mapped object comprise coordinate location data representing the display location coordinates of the object as it appears in a display frame of said media content and a frame address for the display frame in which the object appears, said object mapping N Data being maintained as logically and physically separate data from the media content data, such that the media content data remain uncorrupted by and unembedded with the N Data;

(c) media content display means operable in conjunction with said first user means and responsive to the media content data for providing a visual display of the display frames of said media content while tracking the frame addresses of the display frames being displayed;

(d) interactive digital media (IDM) program means operable in conjunction with said second user means and said media content display means and responsive to the N Data for providing program linkages for connecting objects, for which display location coordinates and frame addresses of the display frames of said media content are specified by the N Data, to respective other functions to be performed upon user selection of the objects in conjunction with display of the media content by said media content display means; and (e) a user system, including said first and second user means and a pointing device for selecting an object when it appears in the visual display of said media content, for operating the IDM program by detecting when an object appearing within the display location coordinates of the N Data for said object in a displayed frame of said media content having a frame address corresponding to the frame address of the N Data for said object is selected by a user and by performing the function linked by the IDM program linkage thereto.

2. A system according to claim 1, wherein the N Data representing the display location coordinates and frame addresses of mapped objects are maintained separately from the Frame Data for the media content.

3. A system according to claim 1, wherein the media content is one selected from the group comprising a movie, music video, video advertising, cable or television programming, and reference works.

4. A system according to claim 1, wherein the linkages provided through an interactive digital media (IDM) program are maintained separately from the N Data for the mapped objects.

5. A system according to claim 1, wherein the user system is coupled to a network for transmitting media content and other data to a user location and includes a set-top box coupled to a television display as said media content display means at the user location.

6. A system according to claim 5, wherein the user system includes an optical pointer as said pointing device for pointing to a target area on the television display, and the set-top box includes a detector for detecting display location coordinates of a target area on the television display pointed to by said pointing device.

7. A system according to claim 1, further comprising:
(a) a network server connected to a plurality of subscriber terminals for providing interactive digital media program services to subscribers on the network system;
(b) the N Data for objects intended to be interactive in the media content being stored in a memory of the network server in association with the Frame Data for media content; and
(c) said user system being constituted by each subscriber terminal having a console connected to a display and to the network system via a transmission link.

8. A network system according to claim 7, wherein the media content is a movie, and Frame Data for the movie and N Data for designated objects appearing therein are transmitted from the network server to the subscriber terminal upon request.

9. A network system according to claim 7, wherein the IDM program is stored with the N Data and is also transmitted from the network server to the subscriber terminal upon request.

10. A network system according to claim 7, wherein the subscriber terminal includes a remote control having an optical pointer device and a pointer detection sensor for detecting the selection of an object by a subscriber using said pointer device.

11. A network system according to claim 7 in the form of a cable TV network, wherein the subscriber terminal console is a cable converter box, the media content is a cable TV program, and N Data for designated objects appearing therein are transmitted from the network server to the subscriber terminal on a cable channel received by the subscriber terminal console.

12. A network system according to claim 11, wherein the subscriber terminal console includes a keypad and means for generating a message to be transmitted back to the network server.

13. A network system according to claim 11, wherein the subscriber terminal console includes a stored IDM-like utility for performing an IDM program in conjunction with display of the media content.

* * * * *